United States Patent
Benton

(10) Patent No.: US 10,241,767 B2
(45) Date of Patent: Mar. 26, 2019

(54) DISTRIBUTED FUNCTION GENERATION WITH SHARED STRUCTURES

(71) Applicant: Red Hat, Inc., Raleigh, NC (US)

(72) Inventor: William Christian Benton, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 13 days.

(21) Appl. No.: 15/441,891

(22) Filed: Feb. 24, 2017

(65) Prior Publication Data

US 2018/0246708 A1   Aug. 30, 2018

(51) Int. Cl.
*G06F 9/45* (2006.01)
*G06F 8/41* (2018.01)

(52) U.S. Cl.
CPC .................... *G06F 8/47* (2013.01)

(58) Field of Classification Search
CPC .......................................... G06F 8/47
USPC .................................. 717/146–148
See application file for complete search history.

(56) References Cited

U.S. PATENT DOCUMENTS

| | | | |
|---|---|---|---|
| 5,345,586 A | 9/1994 | Hamala et al. | |
| 7,426,721 B1* | 9/2008 | Saulpaugh | H04L 67/16 717/143 |
| 8,238,256 B2 | 8/2012 | Nugent | |
| 8,266,274 B2 | 9/2012 | Allen et al. | |
| 8,930,897 B2 | 1/2015 | Nassar | |
| 9,081,975 B2 | 7/2015 | Ducott, III et al. | |
| 9,229,952 B1 | 1/2016 | Meacham et al. | |
| 2006/0190935 A1* | 8/2006 | Kielstra | G06F 9/45516 717/148 |
| 2006/0230070 A1* | 10/2006 | Colton | G06F 8/52 |

(Continued)

FOREIGN PATENT DOCUMENTS

CN   104270402 A   1/2015

OTHER PUBLICATIONS

Ackermann, Stefan et al., "Jet: An Embedded DSL for High Performance Big Data Processing," International Workshop on End-to-end Management of Big Data (BigData 2012), Aug. 31, 2012, Istanbul, Turkey, 10 pages.

(Continued)

*Primary Examiner* — Chameli Das
(74) *Attorney, Agent, or Firm* — Withrow & Terranova, PLLC

(57) ABSTRACT

Distributed function generation with shared structures is disclosed. A plurality of source code instructions that includes a data object definition associated with a data object type and a plurality of function definitions that accesses a data object of the data object type is received. A corresponding plurality of intermediate functions based on the plurality of function definitions is generated. First commands to generate a first set of native functions from corresponding intermediate functions are received. A first set of native functions in corresponding first native instruction sets associated with a first computing environment are generated. Second commands to generate a second set of native functions from corresponding intermediate functions are received. At least one native function in the second set of native functions is absent from the first set of native functions. The second set of native functions is generated in corresponding second native instruction sets associated with a second computing environment.

17 Claims, 6 Drawing Sheets

(56) References Cited

U.S. PATENT DOCUMENTS

| | | | |
|---|---|---|---|
| 2011/0055137 A1* | 3/2011 | Proctor | G06F 9/547 706/47 |
| 2011/0307859 A1* | 12/2011 | Hagenlocher | G06F 9/4484 717/106 |
| 2013/0047155 A1 | 2/2013 | Caspole | |
| 2014/0082597 A1* | 3/2014 | Chafi | G06F 8/443 717/148 |

OTHER PUBLICATIONS

Author Unknown, "Modeling & Mapping," UCLA Center for Domain-Specific Computing, available at least as early as Jul. 29, 2016, 15 pages, http://cdsc.ucla.edu/modeling-mapping/.

Brown, Kevin J. et al., "A Heterogeneous Parallel Framework for Domain-Specific Languages," 2011 International Conference on Parrallel Architectures and Compilation Techniques, Oct. 2011, IEEE, pp. 89-100.

* cited by examiner

DISTRIBUTED FUNCTION GENERATION WITH SHARED STRUCTURES

TECHNICAL FIELD

The examples relate generally to a distributed function generation system that facilitates the generation of interoperable functions and the sharing of data structures in different computing environments.

BACKGROUND

Certain data processing systems, such as machine learning data processing systems, often have a number of different stages, such as a training stage and a subsequent predictive use stage, that will be initiated at different times, and in potentially different computing environments. Moreover, such data processing systems generate data that may be created at one stage and then used at a subsequent stage.

SUMMARY

The examples implement a distributed function generation system that receives, as input, source code instructions that allow the definition of data structures and functions in a high level language, and outputs intermediate functions. The distributed function generation system can subsequently use the intermediate functions to generate corresponding functions for use in any of a number of different computing environments, without a need to re-write the functions for each separate computing environment.

In one example, a method is provided. The method includes receiving a plurality of source code instructions in a computer programming language that includes a data object definition associated with a data object type and a plurality of function definitions that accesses a data object of the data object type. The method further includes generating, based on the plurality of function definitions, a corresponding plurality of intermediate functions, each intermediate function comprising a plurality of intermediate code instructions. The method further includes receiving first commands to generate a first set of native functions from corresponding intermediate functions. The method further includes generating the first set of native functions in corresponding first native instruction sets associated with a first computing environment. The method further includes receiving second commands to generate a second set of native functions from corresponding intermediate functions, at least one native function in the second set of native functions being absent from the first set of native functions, and generating the second set of native functions in corresponding second native instruction sets associated with a second computing environment.

In another example, a computing device is provided. The computing device includes a memory, and a processor device coupled to the memory. The processor device is to receive a plurality of source code instructions in a computer programming language that includes a data object definition associated with a data object type and a plurality of function definitions that accesses a data object of the data object type. The processor device is further to generate, based on the plurality of function definitions, a corresponding plurality of intermediate functions, each intermediate function comprising a plurality of intermediate code instructions. The processor device is further to receive first commands to generate a first set of native functions from corresponding intermediate functions. The processor device is further to generate the first set of native functions in corresponding first native instruction sets associated with a first computing environment. The processor device is further to receive second commands to generate a second set of native functions from corresponding intermediate functions, at least one native function in the second set of native functions being absent from the first set of native functions, and to generate the second set of native functions in corresponding second native instruction sets associated with a second computing environment.

In another example, a computer program product stored on a non-transitory computer-readable storage medium is provided. The computer program product includes instructions to cause a processor device to receive a plurality of source code instructions in a computer programming language that includes a data object definition associated with a data object type and a plurality of function definitions that accesses a data object of the data object type. The instructions further cause the processor device to generate, based on the plurality of function definitions, a corresponding plurality of intermediate functions, each intermediate function comprising a plurality of intermediate code instructions. The instructions further cause the processor device to receive first commands to generate a first set of native functions from corresponding intermediate functions. The instructions further cause the processor device to generate the first set of native functions in corresponding first native instruction sets associated with a first computing environment. The instructions further cause the processor device to receive second commands to generate a second set of native functions from corresponding intermediate functions, at least one native function in the second set of native functions being absent from the first set of native functions, and to generate the second set of native functions in corresponding second native instruction sets associated with a second computing environment.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
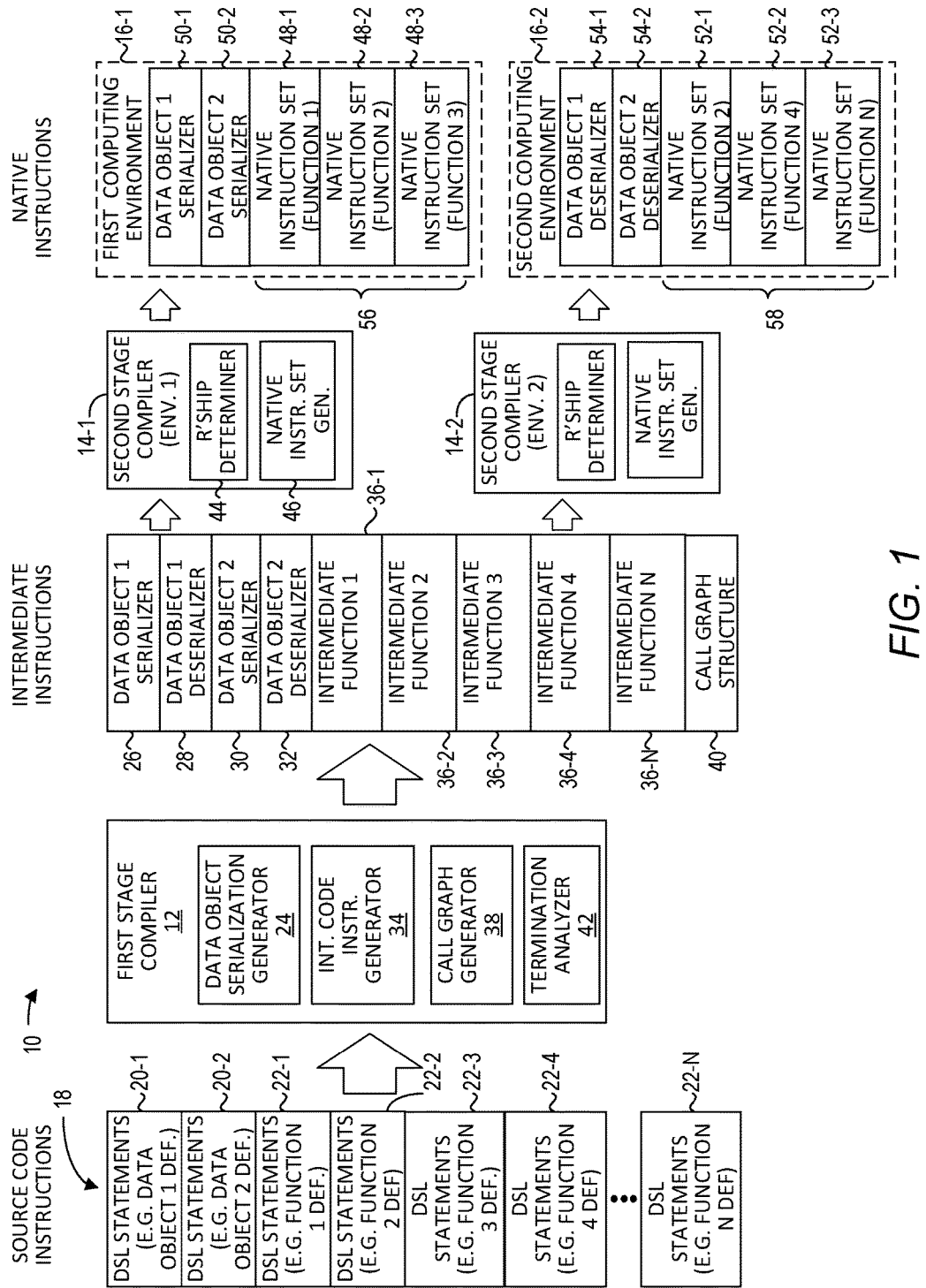
FIG. 1 is a block diagram of a distributed function generation system according to one example.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refer to "one or more" of the element unless otherwise explicitly specified.

Certain data processing systems, such as machine learning data processing systems, often have a number of different stages, such as a training stage and a subsequent predictive use stage, that will be initiated at different times, and in potentially different environments. Moreover, such data processing systems generate data that may be created at one stage and then used at a subsequent stage.

For example, in a machine learning context wherein a model is first trained and then subsequently used to make predictions, a first computing environment in which the model is trained may be quite different from a second computing environment in which the model is used to make predictions. Conventionally, a developer develops and debugs one or more computing programs in the first computing environment that receive data, process the data, and then utilize the data to train the model. The developer then determines the second computing environment in which the model will be used, and develops (and debugs) software in the second computing environment that is configured to receive input, make a prediction against the model, and then output the results to a user. If the model will be used in a third computing environment, the developer again develops (and debugs) software in the third computing environment that is configured to receive input, make a prediction against the model, and then output the results to a user. The developer also generates processes that serialize the model into a data stream in the first computing environment, and deserializes the data stream back into a model for use in the second and third computing environments. Implementing this functionality in two or three different computing environments can take a substantial amount of time, and consequently can be cost prohibitive.

The examples implement a distributed function generation system that receives, as input, source code instructions that allow the definition of data structures and functions in a high level language, and outputs intermediate functions. The distributed function generation system can subsequently use the intermediate functions to generate corresponding functions for use in any of a number of different computing environments, without a need to re-write the functions for each separate computing environment. The distributed function generation system also, in some examples, automatically generates data object serializer functions and data object deserializer functions that can be used to facilitate the transfer of data objects from one computing environment to another computing environment.

FIG. 1 is a block diagram of a distributed function generation system (DFGS) 10 according to one example. The DFGS 10 includes a first stage compiler 12 and a plurality of second stage compilers 14-1-14-2 (generally, second stage compilers 14). The second stage compiler 14-1 is associated with a first computing environment 16-1, and the second stage compiler 14-2 is associated with a second computing environment 16-2 (generally, computing environments 16). The phrase "computing environment" as used herein relates to the targeted output of the second stage compilers 14. For example, the first computing environment 16-1 may comprise a Linux workstation computing environment, and the second computing environment 16-2 may comprise a mobile device, such as an Android device, computing environment. While for purposes of illustration only two computing environments 16 are discussed, the examples may utilize any number of different computing environments 16.

The first stage compiler 12 receives a plurality of source code instructions 18. The source code instructions 18 may have any desired syntax. The source code instructions 18 include one or more data object definitions 20-1, 20-2 (generally, data object definitions 20), and a plurality of function definitions 22-1-22-N (generally, function definitions 22). The data object definitions 20 identify data structures that are utilized by the function definitions 22. By way of non-limiting examples, and in particular in a machine learning context, the data object definitions 20 may comprise: scalar numeric types, including signed fixed-width integers of various sizes (e.g., 8-bit, 16-bit, and so on), floating-point numbers of various sizes and precisions, fixed-point numbers of various sizes; tensor types, parameterized by a numeric type, e.g., a vector of 8-bit integers, a matrix of double-precision floating-point numbers; variable-length character strings; parameterized homogeneous finite lists of values, e.g., a list of strings or a list of vectors, supporting constant-time access to the first element and linear-time access to arbitrary elements; homogeneous sets of values, i.e., unordered collections of distinct values, with the set type parameterized by the element type; homogeneous finite variable-length arrays of values supporting constant-time access to arbitrary elements; parameterized homogeneous iterators over collections, supporting access to each element of the collections exactly once and potentially backed by collections external to the program (e.g., representing data stored in a database or distributed across memory on multiple machines); compound types, including parameterized maps (dictionaries), or finite functions from a domain type to a range type, parameterized product types, or typed fixed-arity tuples, e.g. a pair of two 32-bit integers, or a pair of a character string and a vector of double-precision floating-point numbers; parameterized record types, or tuples with fixed names for each element; parameterized sum types, or tagged unions, so that a single type may include values with multiple shapes. As an example, a list with elements of X as a sum type could be declared as follows: a list of X is either a cell of X or the empty list, a cell of X is a record with two fields: the head is a value of X and the tail is a list of X, and the empty list is a 0-arity tuple.

In some examples, domain-specific language programs exist independently of host-language programs. In some examples, the source code instructions 18 are in an embedded domain specific language and can be used in conjunction with other programming languages.

The function definitions 22 implement desired behavior. By way of non-limiting examples, and in particular in a machine learning context, a function definition 22 may include a function name, a function type, and a function body. Function names may be arbitrary identifiers used to refer to functions elsewhere in a program. Function types include the input types for each function argument and the result type of the function; for example, "max", a function to identify the largest of two integers might have the type (Int, Int)->Int, indicating that the max function takes two integer values and returns one integer value. A function body may be an expression. Non-limiting examples of expressions may include binding expressions, which include a binding list and a body. The binding list is a sequence of pairs of variable names and expressions; these are evaluated in order, and then the body is evaluated in the context of bindings from the binding list. For example, if the binding list included x=1 and y=2 and the body was x+y, then the binding expression would evaluate to 3. An expression may also be a function, which evaluates to the result of applying the function to particular arguments. For example, applying the aforementioned max function to 4 and 7 would evaluate to 7. In some examples, the first stage compiler 12 prohibits looping (such as For statements, While statements, and the like) other than sub-structural recursion (i.e., wherein a function calls itself), wherein the first stage compiler 12 can determine that the size of a function's argument decreases with each recursive call, in order to ensure that a program will eventually terminate.

An expression may also include comparison operations on values of built-in numeric types, i.e., greater-than, less-than, equal, not-equal, greater-than-or-equal-to, less-than-or-equal-to, and logical operations on values of Boolean types, including AND, OR, NOT, and XOR operations, and scalar arithmetic operations, including addition, subtraction, division, multiplication, remainder, negation, rounding, and truncation. Expressions may also include matrix and vector arithmetic operations, including elementwise operations, dot product, matrix-matrix multiplication, matrix-vector multiplication, etc. Expressions may also include structural match expressions, which take a parameter and have a sequence of case clauses, each of which contains: 1) a head clause, which describes a possible shape for the parameter and optional variable bindings for its constituent parts; 2) an optional guard, which is a Boolean expression; and 3) a body, which is another expression. In some examples, every body of a given structural match expression must have the same type. Expressions may also include aggregation operations over collections of values (e.g., minimum, maximum, sum, count, mean, variance, etc.)

The first stage compiler 12 includes a data object serialization generator 24 that operates to generate data object serializers 26, 30 that are configured to serialize a data object of the corresponding data object type into a data object stream. In this example, based on the data object definition 20-1, the first stage compiler 12 automatically generates a data object serializer 26 that comprises intermediate code instructions configured to serialize a data object of the data object type defined by the data object definition 20-1. The intermediate code instructions are in an intermediate representation (IR) that is suitable for analysis. A program, or function, in the IR has the same meaning as the source code instructions 18 it was generated from, but has been converted into a simpler form that is easier to analyze. By way of non-limiting example, a high-level program fragment such as: x=a*(b+y*z) may be translated to IR with only one operation per expression, such as:

$t1 = y*z$ $t2 = b + t1$ $x = a*t2$

The data object serialization generator 24 also operates to generate intermediate data object deserializers 28, 32 that are configured to deserialize a data object stream into a data object of the data object type. In this example, based on the data object definition 20-1, the first stage compiler 12 automatically generates a data object deserializer 28 that comprises intermediate code instructions configured to deserialize a data object stream into a data object of the data object type defined by the data object definition 20-1. Note that the data object serialization generator 24 generates the data object serializer 26 and the data object deserializer 28 automatically.

The data object serialization generator 24 similarly generates a data object serializer 30 and a data object deserializer 32 based on the data object definition 20-2. The data object serializer 30 comprises intermediate code instructions configured to serialize a data object of the data object type defined by the data object definition 20-2. The data object deserializer 32 comprises intermediate code instructions configured to deserialize a data object stream into a data object of the data object type defined by the data object definition 20-2.

The first stage compiler 12 includes an intermediate code instruction generator 34 that generates, based on the plurality of function definitions 22-1-22-N, a corresponding plurality of intermediate functions 36-1-36-N (generally, intermediate functions 36), each intermediate function 36 comprising a plurality of intermediate code instructions that implement the function defined by the corresponding function definition 22. The first stage compiler 12 also includes a call graph generator 38 that is configured to generate a call graph structure 40 that identifies relationships between the intermediate functions 36, and that identifies parameters received and/or returned by the intermediate functions 36. The first stage compiler 12 includes a termination analyzer 42 that analyzes each respective intermediate function 36 to determine if each recursive call to the respective intermediate function 36 reduces a size of an argument that the respective intermediate function 36 received. This ensures that no intermediate function 36 can inadvertently, or intentionally, cause the intermediate function 36 to process indefinitely.

The second stage compilers 14 operate to generate corresponding programs suitable for execution in a particular computing environment 16. The second stage compilers 14 may generate native source code instruction sets, or may generate native executable instruction sets. The computing environments 16 may comprise different operating systems, including different types of machines, such as a workstation, a smart phone, a computing tablet, and the like. Typically the second stage compilers 14 receive commands that direct the second stage compilers 14 to generate native instruction sets from corresponding intermediate functions 36 that implement, in the respective computing environment 16, the intermediate functions 36. The second stage compiler 14-1 includes a relationship determiner 44 that analyzes the call graph structure 40 to determine relationships between data object definitions 20 and intermediate functions 36 that utilize the data object definitions 20. The second stage compiler 14-1 also includes a native instruction set generator 46 that operates to generate native instruction sets 48-1-48-3 suitable for the first computing environment 16-1. The native instruction sets 48-1-48-3 may comprise source code instructions that are suitable for compilation by a downstream compiler in the first computing environment 16-1, or may comprise executable instructions that are suitable for execution in the first computing environment 16-1.

As an example, in response to a plurality of commands, the second stage compiler 14-1 may generate a native instruction set 48-1 that implements, in the first computing environment 16-1, the intermediate function 36-1. The second stage compiler 14-1 may also generate a native instruction set 48-2 that implements, in the first computing environment 16-1, the intermediate function 36-2, and a native instruction set 48-3 that implements, in the first computing environment 16-1, the intermediate function 36-3. Based on parameters of the intermediate functions 36-1, 36-2, and 36-3, as identified in the call graph structure 40, the second stage compiler 14-1 may also generate a data object serializer 50-1 that implements the data object serializer 26 in the first computing environment 16-1, and a data object serializer 50-2 that implements the data object serializer 30 in the first computing environment 16-1.

In response to a different plurality of commands, the second stage compiler 14-2 may similarly generate a plurality of native instruction sets 52-1, 52-2, and 52-3 that implement the intermediate functions 36-2, 36-4 and 36-N in the second computing environment 16-2, respectively. Based on the call graph structure 40, the second stage compiler 14-2 may also generate a data object deserializer 54-1 that implements the data object deserializer 28 in the second computing environment 16-2, and a data object deserializer 54-2 that implements the data object deserializer 32 in the second computing environment 16-2.

Solely as an example in a machine learning context, the first computing environment 16-1 may comprise a Linux workstation environment, and the native instruction sets 48-1-48-3 may comprise a training component 56 that cleans data, filters and normalizes the data, maps features of the data, chooses a set of hyperparameters that perform well, and then evaluates the model performance before producing a model. The model may be a data object defined by one or more of the data object definitions 20. The second computing environment 16-2 may comprise a mobile device computing environment, and native instruction sets 52-1-52-3 may comprise a real-time prediction component 58, that utilizes some of the same functions used in the training component 56, such as for cleaning data and feature extraction. The real-time prediction component 58 may also use the model generated in the first computing environment 16-1. The real-time prediction component 58 may be embedded in another program that operates on events as the events occur, such as to prevent fraudulent transactions, for example.

Figure 2A:
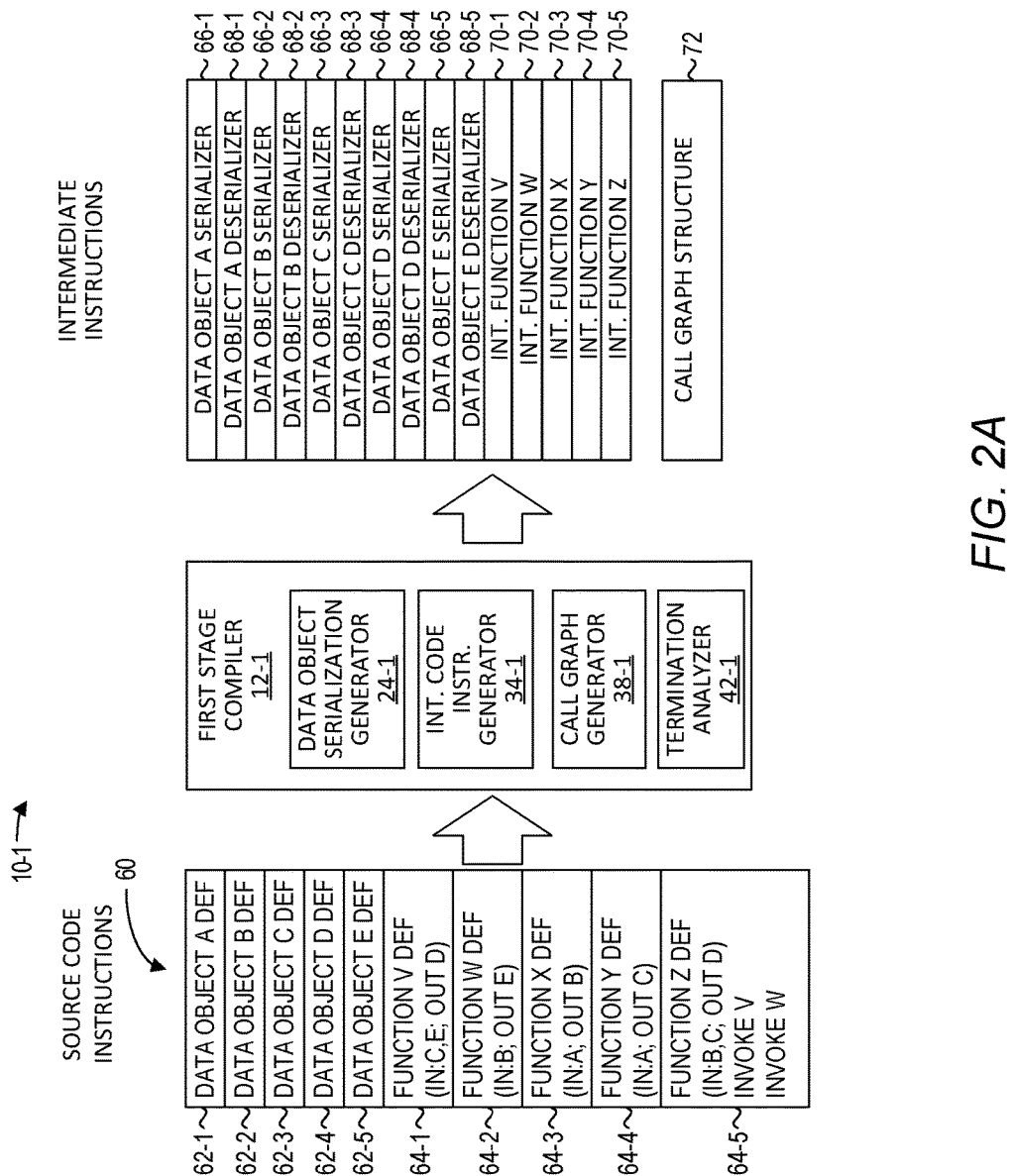
FIGS. 2A and 2B are block diagrams of a distributed function generation system according to another example.
Figure 2B:
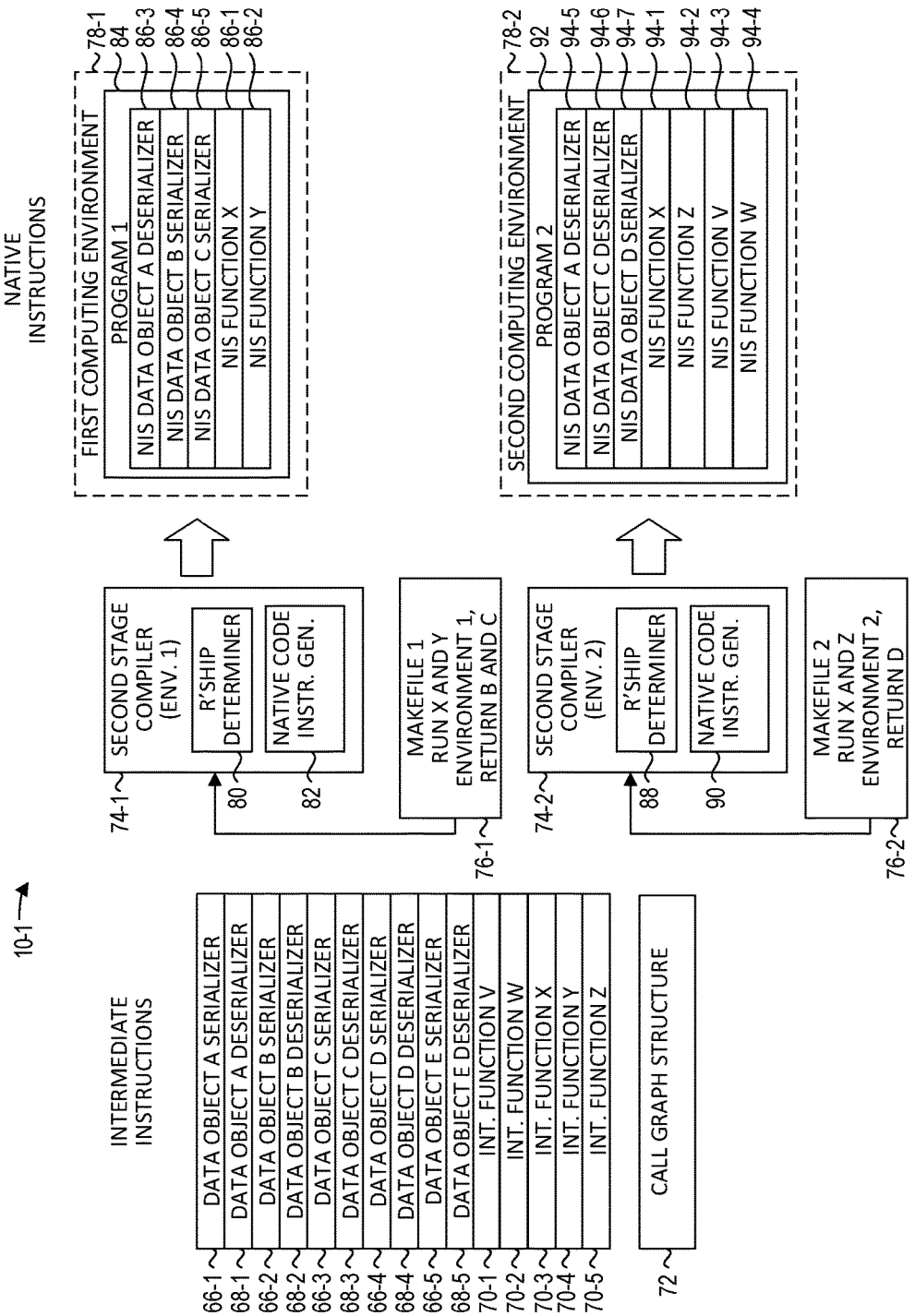

FIGS. 2A and 2B are block diagrams of a DFGS 10-1 according to another example. The DFGS 10-1 may operate substantially similarly to the DFGS 10 discussed above with respect to FIG. 1 except as otherwise discussed herein. Referring first to FIG. 2A, in this example a first stage compiler 12-1 receives a plurality of source code instructions 60 in a computer programming language having a syntax that permits data object definitions and function definitions that access data objects defined by the data object definitions. In this example the source code instructions 60 include a plurality of data object definitions 62-1-62-5. The source code instructions 60 also include a plurality of function definitions 64-1-64-5 (generally, function definitions 64). The data object definitions 62-1-62-5 define data objects (sometimes referred to as data structures) A, B, C, D, and E, respectively. The plurality of function definitions 64-1-64-5 defines functions V, W, X, Y, and Z. A function V (defined by the function definition 64-1) receives, as input, data objects defined by the data object definitions 62-3, 62-5 (i.e., data objects of type C and type E). The function V outputs a data object defined by the data object definition 62-4 (i.e., a data object of type D). A function W (defined by the function definition 64-2) receives, as input, a data object defined by the data object definition 62-2 (i.e., a data object of type B). The function W outputs a data object defined by the data object definition 62-5 (i.e., a data object of type E).

A function X (defined by the function definition 64-3) receives, as input, a data object defined by the data object definition 62-1 (i.e., a data object of type A). The function X outputs a data object defined by the data object definition 62-2 (i.e., a data object of type B). A function Y (defined by the function definition 64-4) receives, as input, a data object defined by the data object definition 62-1 (i.e., a data object of type A). The function Y outputs a data object defined by the data object definition 62-3 (i.e., a data object of type C). A function Z (defined by the function definition 64-5) receives, as input, data objects defined by the data object definitions 62-2, 62-3 (i.e., data objects of type B and type C). The function Z outputs a data object defined by the data object definition 62-4 (i.e., a data object of type D). The function Z may also invoke the function V (defined by the function definition 64-1) and the function W (defined by the function definition 64-2)

A data object serialization generator 24-1, based on the data object definitions 62-1-62-5, automatically generates a plurality of data object serializers 66-1-66-5, each of which comprises intermediate code instructions configured to serialize a data object of the data object type defined by the corresponding data object definition 62-1-62-5 into a data object stream. The data object serialization generator 24-1, based on the data object definitions 62-1-62-5, also automatically generates a plurality of data object deserializers 68-1-68-5, each of which comprises intermediate code instructions configured to deserialize a data object stream into a data object of the data object type defined by the corresponding data object definition 62-1-62-5.

An intermediate code instruction generator 34-1 generates, based on the plurality of function definitions 64-1-64-5, a corresponding plurality of intermediate functions 70-1-70-5 (generally, intermediate functions 70), each intermediate function 70 comprising a plurality of intermediate code instructions that implement the function defined by the corresponding function definition 64. A call graph generator 38-1 operates to generate a call graph structure 72 that identifies relationships between the intermediate functions 70, and that identifies parameters, in this case data objects of the type defined by the data object definitions 62-1-62-5, received and/or returned by the intermediate functions 70. The call graph structure 72 also indicates that a function Z can invoke a function V and a function W. A termination analyzer 42-1 analyzes each respective intermediate function 70 to determine if each recursive call made in any intermediate function 70 reduces a size of an argument that the respective intermediate function 70 received. This ensures that no intermediate function 70 can inadvertently, or intentionally, process indefinitely.

Referring now to FIG. 2B, a second stage compiler 74-1 receives a plurality of commands 76-1 to generate native functions X and Y (defined by the function definitions 64-3, 64-4) for a first computing environment 78-1, and to return data objects of type B and C (defined by the data object definitions 62-2, 62-3, respectively). A relationship determiner 80 accesses the call graph structure 72 to determine the relationships between the intermediate functions 70-3, 70-4, and the parameters utilized by the intermediate functions 70-3, 70-4. A native code instruction generator 82 accesses the intermediate function 70-3 and generates a program 84 that includes a native instruction set (NIS) 86-1 that implements, in the first computing environment 78-1, a native function X. The native code instruction generator 82 accesses the intermediate function 70-4 and generates a native instruction set 86-2 that implements, in the first computing environment 78-1, a function Y. Because the call graph structure 72 indicates that a function X receives, as input, a data object A defined by the data object definition 62-1, the native code instruction generator 82 accesses the data object deserializer 68-1, and automatically generates a native instruction set 86-3 that implements, in the first computing environment 78-1, the data object deserializer 68-1 to deserialize a data object stream into a data object of type A.

The native code instruction generator 82 also accesses the data object serializer 66-2, and automatically generates a native instruction set 86-4 that implements, in the first computing environment 78-1, the data object serializer 66-2 to serialize a data object of type B into a data object stream. The native code instruction generator 82 also accesses the data object serializer 66-3, and automatically generates a native instruction set 86-5 that implements, in the first computing environment 78-1, the data object serializer 66-3 to serialize a data object of type C into a data object stream. Native instruction sets 86-1-86-5 are referred to generally as "native instruction sets 86."

A second stage compiler 74-2 receives a plurality of commands 76-2 to generate functions X and Z (defined by the function definitions 64-3 and 64-5, respectively) for a second computing environment 78-2, and to return a data object of type D (defined by the data object definition 62-4). A relationship determiner 88 accesses the call graph structure 72 to determine the relationships between the intermediate functions 70-3 and 70-5, and the parameters utilized by the intermediate functions 70-3 and 70-5. A native code instruction generator 90 accesses the intermediate function 70-3 and generates a program 92 that includes a native instruction set 94-1 that implements, in the second computing environment 78-2, a function X. The native code instruction generator 90 accesses the intermediate function 70-5 and generates a native instruction set 94-2 that implements, in the second computing environment 78-2, a function Z.

Because the call graph structure 72 indicates that a function Z can invoke a function V and a function W, the native code instruction generator 90 automatically accesses the intermediate function 70-1 and generates a native instruction set 94-3 that implements, in the second computing environment 78-2, a function V. The native code instruction generator 90 also automatically accesses the intermediate function 70-2 and generates a native instruction set 94-4 that implements, in the second computing environment 78-2, a function W.

Because the call graph structure 72 indicates that a function X receives, as input, a data object A defined by the data object definition 62-1, the native code instruction generator 90 accesses the data object deserializer 68-1, and automatically generates a native instruction set 94-5 that implements, in the second computing environment 78-2, the data object deserializer 68-1 to deserialize a data object stream into a data object of type A.

Because the call graph structure 72 indicates that a function Z receives, as input, a data object C defined by the data object definition 62-3, the native code instruction generator 90 accesses the data object deserializer 68-3, and automatically generates a native instruction set 94-6 that implements, in the second computing environment 78-2, the data object deserializer 68-3 to deserialize a data object stream into a data object of type C.

Because the function Z returns a data object D defined by the data object definition 62-4, the native code instruction generator 90 accesses the data object serializer 66-4, and automatically generates a native instruction set 94-7 that implements, in the second computing environment 78-2, the data object serializer 66-4 to serialize a data object of type D into a data object stream. Native instruction sets 94-1-94-7 are referred to generally as "native instruction sets 94."

In this example, note that a function X, defined by the function definition 64-3 in the source code instructions 60, was implemented in the two different computing environments 78-1, 78-2, without a need to rewrite or otherwise modify the function definition 64-3. Also note that the relationships between the function Z and the functions V and W were identified, and the native instruction sets 94-3, 94-4 were generated automatically, without a need for a user to be aware of such relationships.

Figure 3:
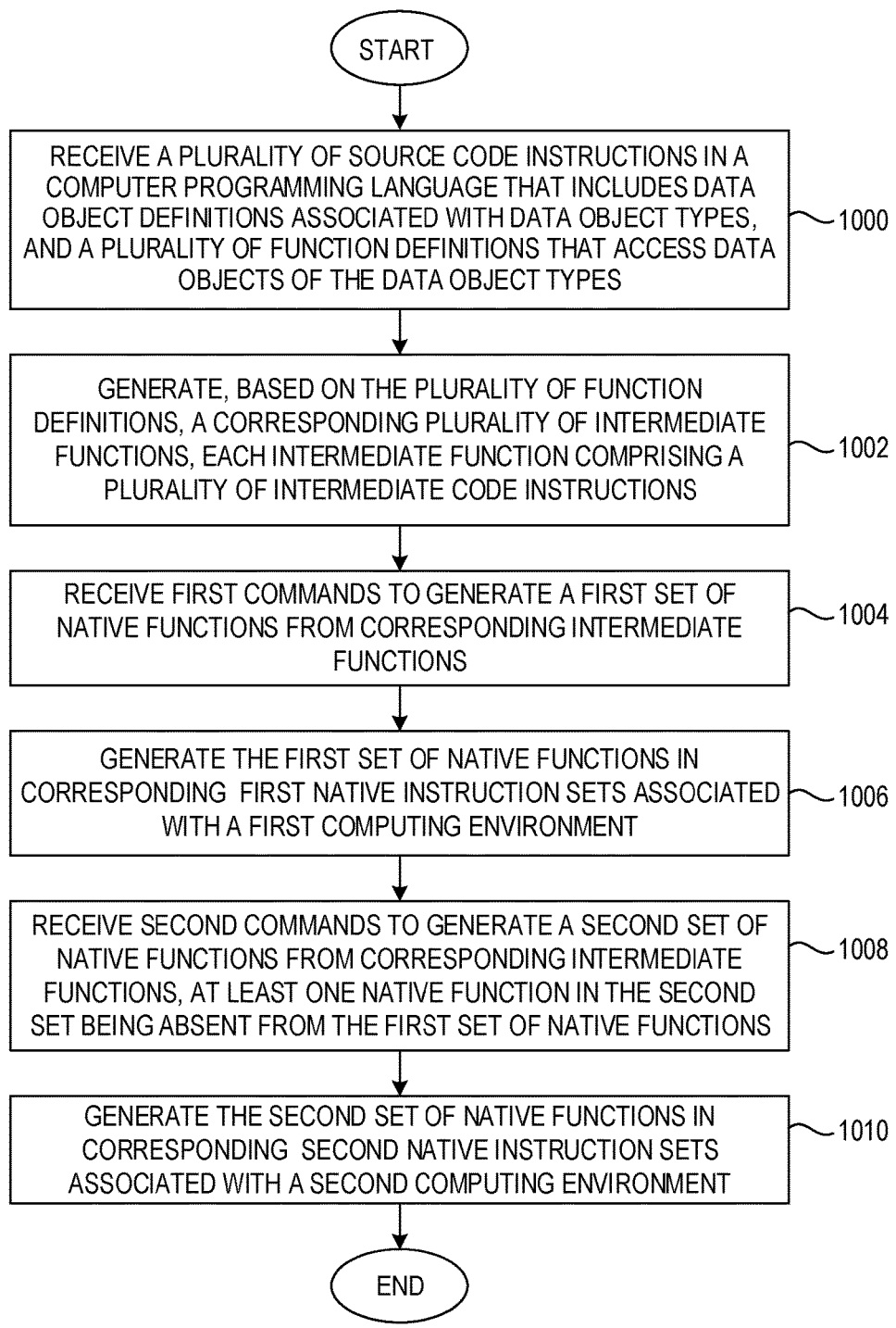
FIG. 3 is a flowchart for distributed function generation with shared structures according to one example.

FIG. 3 is a flowchart for distributed function generation with shared structures according to one example. FIG. 3 will be discussed in conjunction with FIGS. 2A and 2B. The first stage compiler 12-1 receives the plurality of source code instructions 60 in a computer programming language that includes data object definitions 62-1-62-5 associated with the data object types A-E, and the plurality of function definitions 64-1-64-5 that accesses data objects of the data object types A-E (FIG. 3, block 1000). The first stage compiler 12-1 generates, based on the plurality of function definitions 64-1-64-5, the corresponding plurality of intermediate functions 70-1-70-5, each intermediate function 70-1-70-5 comprising a plurality of intermediate code instructions (FIG. 3, block 1002). The second stage compiler 74-1 receives first commands 76-1 to generate a first set of native functions from corresponding intermediate functions 70 (FIG. 3, block 1004). The second stage compiler 74-1 generates the first set of native functions in corresponding first native instruction sets 86 associated with the first computing environment 78-1 (FIG. 3, block 1006).

The second stage compiler 74-2 receives second commands 76-2 to generate a second set of native functions from corresponding intermediate functions 70, at least one native function in the second set of native functions being absent from the first set of native functions (FIG. 3, block 1008). The second stage compiler 74-2 generates the second set of native functions in corresponding second native instruction sets 94 associated with the second computing environment 78-2 (FIG. 3, block 1010).

In some examples, the first stage compiler 12 and second stage compiler(s) 14 are components of a computing device, and thus functionality implemented by the first stage compiler 12 and the second stage compiler(s) 14 may be attributed to a computing device generally. Moreover, in examples where the first stage compiler 12 and the second stage compiler(s) 14 comprise software instructions that program a processor device to carry out functionality discussed herein, functionality implemented by the first stage compiler 12 and the second stage compiler(s) 14 may be attributed herein to such processor device.

Figure 4:
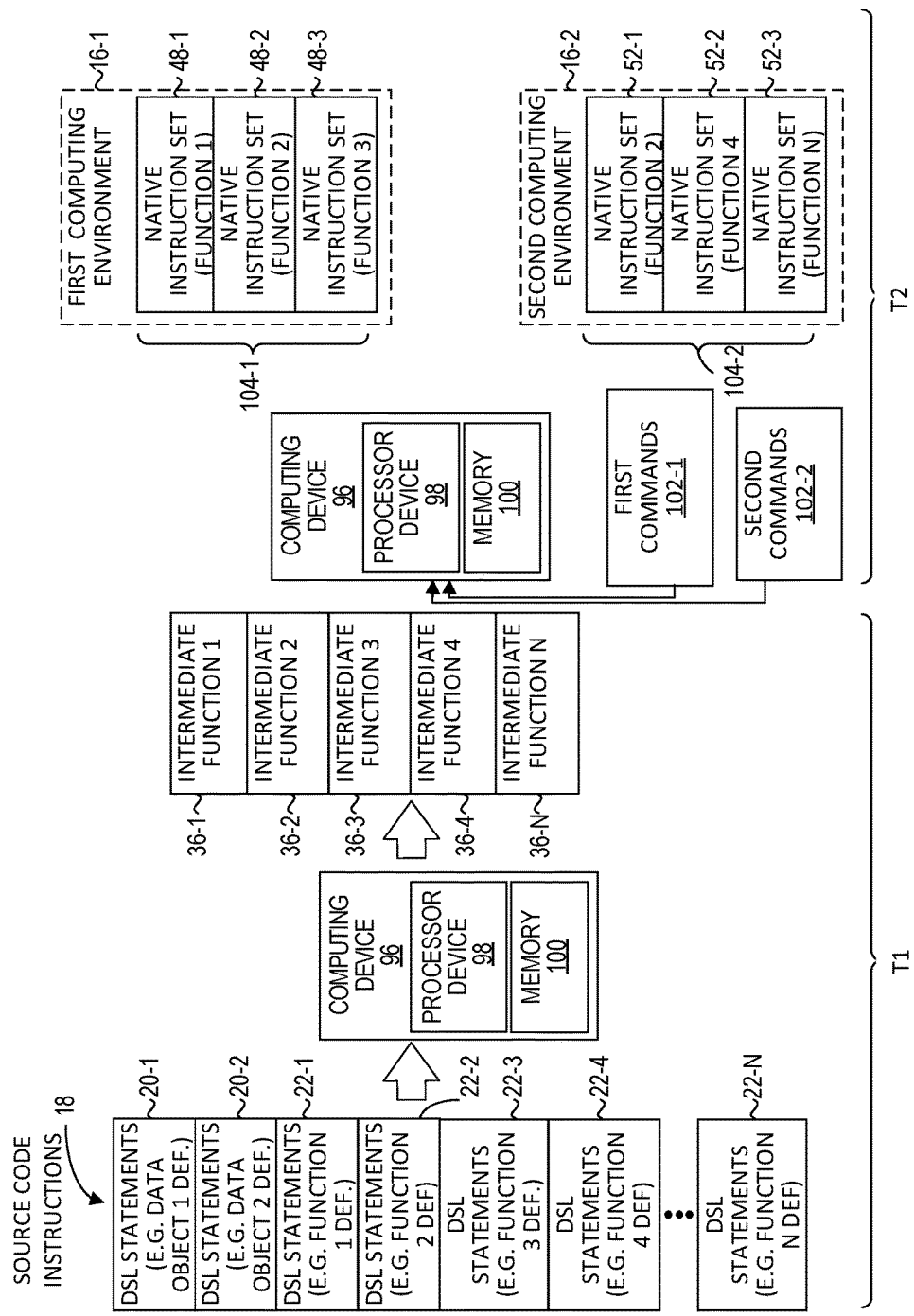
FIG. 4 is a block diagram of a distributed function generation system according to another example.

FIG. 4 is a block diagram of such an environment, according to one example. A computing device 96 includes a processor device 98 and a memory 100. During a first time period T1, the processor device 98 is to receive the plurality of source code instructions 18 in a computer programming language that includes the data object definitions 20 (e.g., 20-1, 20-2) associated with corresponding data object types, and a plurality of function definitions 22 (e.g., 22-1-22-N)

that accesses data objects of the data object types. The processor device 98 is further to generate, based on the plurality of function definitions 22, a corresponding plurality of intermediate functions 36-1-36-N (generally, intermediate functions 36), each intermediate function 36 comprising a plurality of intermediate code instructions. During a second time period T2, the processor device 98 is further to receive first commands 102-1 to generate a first set of native functions 104-1 from corresponding intermediate functions 36-4. The processor device 98 is further to generate the first set of native functions 104-1 in corresponding first native instruction sets 48-1-48-3 associated with a first computing environment 16-1. The processor device 98 is further to receive second commands 102-2 to generate a second set of native functions 104-2 from corresponding intermediate functions 36, at least one native function in the second set of native functions 104-2 being absent from the first set of native functions 104-1. The processor device 98 generates the second set of native functions 104-2 in corresponding second native instruction sets 52-1-52-3 associated with a second computing environment 16-2.

Figure 5:
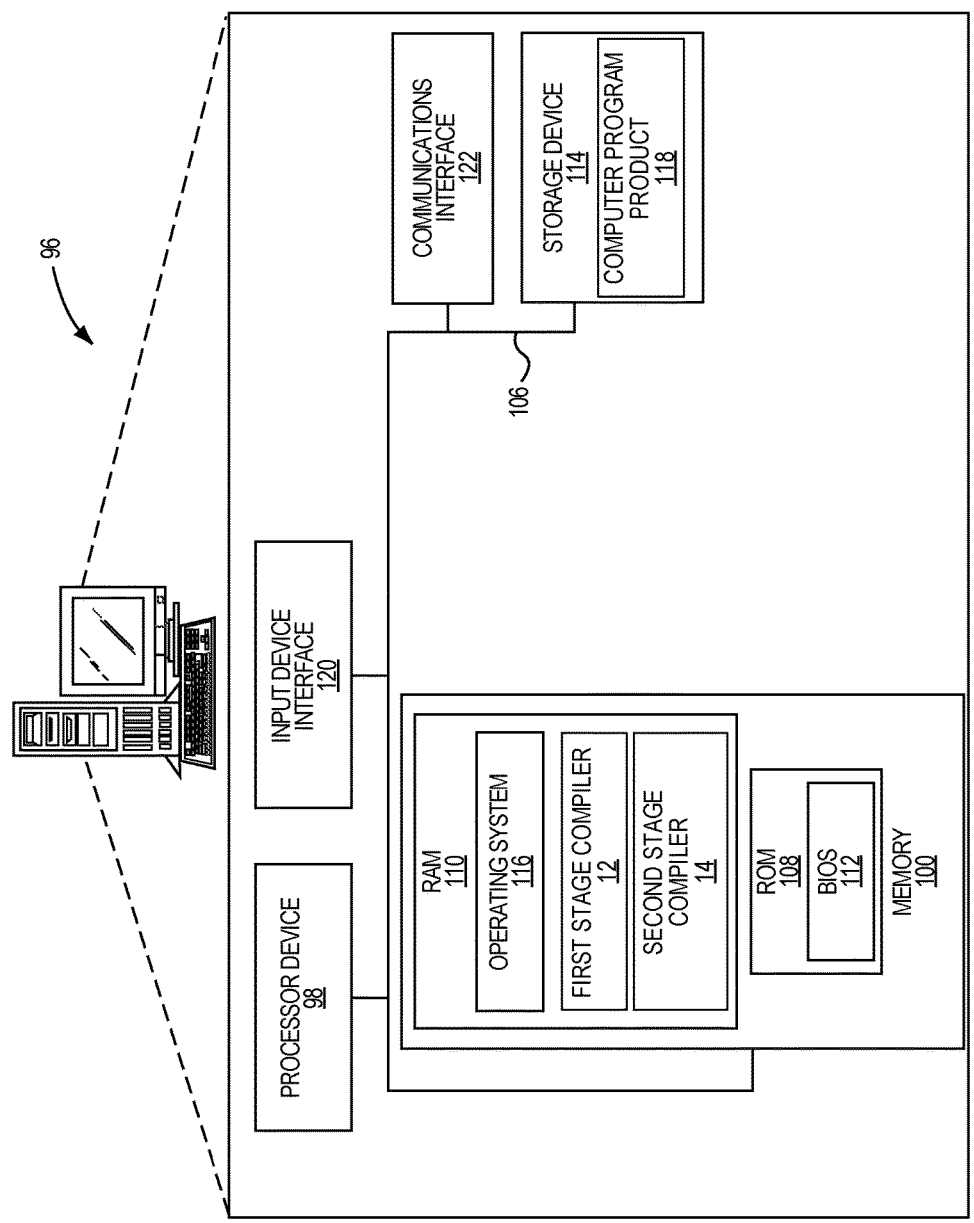
FIG. 5 is a block diagram of a computing device according to one example.

FIG. 5 is a block diagram of the computing device 96 suitable for implementing examples, according to one example. The computing device 96 may comprise any computing or electronic device capable of including firmware and/or hardware, and/or executing software instructions to implement the functionality described herein, such as a computer server, a desktop computing device, a laptop computing device, a smartphone, a computing tablet, or the like. The computing device 96 includes the processor device 98, the memory 100, and a system bus 106. The system bus 106 provides an interface for system components including, but not limited to, the memory 100 and the processor device 98. The processor device 98 can be any commercially available or proprietary processor.

The system bus 106 may be any of several types of bus structures that may further interconnect to a memory bus (with or without a memory controller), a peripheral bus, and/or a local bus using any of a variety of commercially available bus architectures. The memory 100 may include non-volatile memory 108 (e.g., read-only memory (ROM), erasable programmable read-only memory (EPROM), electrically erasable programmable read-only memory (EEPROM), etc.), and volatile memory 110 (e.g., random-access memory (RAM)). A basic input/output system (BIOS) 112 may be stored in the non-volatile memory 108 and can include the basic routines that help to transfer information between elements within the computing device 96. The volatile memory 110 may also include a high-speed RAM, such as static RAM, for caching data.

The computing device 96 may further include or be coupled to a non-transitory computer-readable storage medium such as a storage device 114, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 114 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in an operating environment, and, further, that any such media may contain computer-executable instructions for performing novel methods of the disclosed examples.

A number of modules can be stored in the storage device 114 and in the volatile memory 110, including an operating system 116 and one or more program modules, such as the first stage compiler 12 and the second stage compiler 14. It is to be appreciated that the examples can be implemented with various commercially available operating systems 116 or combinations of operating systems 116.

All or a portion of the examples may be implemented as a computer program product 118 stored on a transitory or non-transitory computer-usable or computer-readable storage medium, such as the storage device 114, which includes complex programming instructions, such as complex computer-readable program code, to cause the processor device 98 to carry out the steps described herein. Thus, the computer-readable program code can comprise software instructions for implementing the functionality of the examples described herein when executed on the processor device 98. The processor device 98, in conjunction with the first stage compiler 12 and the second stage compiler 14 in the volatile memory 110, may serve as a controller, or control system, for the computing device 96 that is to implement the functionality described herein.

An operator may also be able to enter one or more configuration commands through a keyboard (not illustrated), a pointing device such as a mouse (not illustrated), or a touch-sensitive surface. Such input devices may be connected to the processor device 98 through an input device interface 120 that is coupled to the system bus 106 but can be connected by other interfaces such as a parallel port, an Institute of Electrical and Electronic Engineers (IEEE) 1394 serial port, a Universal Serial Bus (USB) port, an IR interface, and the like.

The computing device 96 may also include a communications interface 122 suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:
1. A method comprising:
receiving, by a computing device comprising a processing device, a plurality of source code instructions in a computer programming language that includes:
 a data object definition associated with a data object type;
 a plurality of function definitions that accesses a data object of the data object type;
generating, based on the plurality of function definitions, a corresponding plurality of intermediate functions, each intermediate function comprising a plurality of intermediate code instructions;
receiving first commands to generate a first set of native functions from corresponding intermediate functions;
generating the first set of native functions in corresponding first native instruction sets associated with a first computing environment;
receiving second commands to generate a second set of native functions from corresponding intermediate functions, at least one native function in the second set of native functions being absent from the first set of native functions;

generating the second set of native functions in corresponding second native instruction sets associated with a second computing environment;

generating, based on the data object definition, a data object serializer comprising a plurality of intermediate code instructions, the data object serializer configured to serialize the data object of the data object type into a data object stream in the first computing environment; and generating, based on the data object definition, a data object deserializer comprising a plurality of intermediate code instructions, the data object deserializer configured to deserialize the data object stream back into the data object of the data object type in the second computing environment.

2. The method of claim 1 further comprising generating a structure that identifies relationships between the intermediate functions, and that identifies parameters received and/or returned by the intermediate functions.

3. The method of claim 1 wherein the first commands identify a first function definition, and further comprising:

determining that the first function definition outputs the data object of the data object type; and in response to determining that the first function definition outputs the data object of the data object type, automatically including the data object serializer in the first set of native functions.

4. The method of claim 3 wherein the second commands identify a second function definition, and further comprising:

determining that the second function definition receives the data object of the data object type as input; and in response to determining that the second function definition receives the data object of the data object type as input, automatically including the data object deserializer in the second set of native functions.

5. The method of claim 1 further comprising analyzing each respective intermediate function to determine if each recursive call to the respective intermediate function reduces a size of an argument that the respective intermediate function received.

6. The method of claim 1 wherein the first native instruction sets comprise executable code configured to execute in the first computing environment.

7. The method of claim 1 wherein the first native instruction sets comprise source code configured to implement functionality of the first set of native functions.

8. A computing device, comprising:

a memory; and a processor device coupled to the memory to:

receive a plurality of source code instructions in a computer programming language that includes:

a data object definition associated with a data object type; and a plurality of function definitions that accesses a data object of the data object type;

generate, based on the plurality of function definitions, a corresponding plurality of intermediate functions, each intermediate function comprising a plurality of intermediate code instructions;

receive first commands to generate a first set of native functions from corresponding intermediate functions;

generate the first set of native functions in corresponding first native instruction sets associated with a first computing environment;

receive second commands to generate a second set of native functions from corresponding intermediate functions, at least one native function in the second set of native functions being absent from the first set of native functions;

generate the second set of native functions in corresponding second native instruction sets associated with a second computing environment;

generate, based on the data object definition, a data object serializer comprising a plurality of intermediate code instructions, the data object serializer configured to serialize the data object of the data object type into a data object stream in the first computing environment; and generate, based on the data object definition, a data object deserializer comprising a plurality of intermediate code instructions, the data object deserializer configured to deserialize the data object stream back into the data object of the data object type in the second computing environment.

9. The computing device of claim 8 wherein the processor device is further to generate a structure that identifies relationships between the intermediate functions, and that identifies parameters received and/or returned by the intermediate functions.

10. The computing device of claim 8 wherein the first commands identify a first function definition, and wherein the processor device is further to:

determine that the first function definition outputs the data object of the data object type; and in response to determining that the first function definition outputs the data object of the data object type, automatically including the data object serializer in the first set of native functions.

11. The computing device of claim 10 wherein the second commands identify a second function definition, and wherein the processor device is further to:

determine that the second function definition receives the data object of the data object type as input; and in response to determining that the second function definition receives the data object of the data object type as input, automatically including the data object deserializer in the second set of native functions.

12. The computing device of claim 8 wherein the processor device is further to analyze each respective intermediate function to determine if each recursive call to the respective intermediate function reduces a size of an argument that the respective intermediate function received.

13. A computer program product stored on a non-transitory computer-readable storage medium and including instructions configured to cause a processor device to:

receive a plurality of source code instructions in a computer programming language that includes:

a data object definition associated with a data object type; and a plurality of function definitions that accesses a data object of the data object type;

generate, based on the plurality of function definitions, a corresponding plurality of intermediate functions, each intermediate function comprising a plurality of intermediate code instructions;

receive first commands to generate a first set of native functions from corresponding intermediate functions;

generate the first set of native functions in corresponding first native instruction sets associated with a first computing environment;

receive second commands to generate a second set of native functions from corresponding intermediate functions, at least one native function in the second set of native functions being absent from the first set of native functions;

generate the second set of native functions in corresponding second native instruction sets associated with a second computing environment;

generate, based on the data object definition, a data object serializer comprising a plurality of intermediate code instructions, the data object serializer configured to serialize the data object of the data object type into a data object stream in the first computing environment; and generate, based on the data object definition, a data object deserializer comprising a plurality of intermediate code instructions, the data object deserializer configured to deserialize the data object stream back into the data object of the data object type in the second computing environment.

14. The computer program product of claim 13 wherein the instructions further cause the processor device to generate a structure that identifies relationships between the intermediate functions, and that identifies parameters received and/or returned by the intermediate functions.

15. The computer program product of claim 13 wherein the first commands identify a first function definition, and wherein the instructions further cause the processor device to:

determine that the first function definition outputs the data object of the data object type; and in response to determining that the first function definition outputs the data object of the data object type, automatically including the data object serializer in the first set of native functions.

16. The computer program product of claim 15 wherein the second commands identify a second function definition, and wherein the instructions further cause the processor device to:

determine that the second function definition receives the data object of the data object type as input; and in response to determining that the second function definition receives the data object of the data object type as input, automatically including the data object deserializer in the second set of native functions.

17. The computer program product of claim 13 wherein the instructions further cause the processor device to analyze each respective intermediate function to determine if each recursive call to the respective intermediate function reduces a size of an argument that the respective intermediate function received.

* * * * *